Patented Feb. 13, 1951

2,541,773

UNITED STATES PATENT OFFICE 2,541,773

PROCESS OF FORMING INSOLUBLE LAYERS FROM CARBOHYDRATES

Jan Lolkema and Cornelis M. H. Kool, Hoogezand, Netherlands, assignors to Naamlooze Vennootschap: W. A. Scholten's Chemische Fabrieken, Groningen, Netherlands, a corporation of the Netherlands No Drawing. Application February 15, 1946, Serial No. 648,016. In the Netherlands April 25, 1941

Section 1, Public Law 690, August 8, 1946
Patent expires April 25, 1961

19 Claims. (Cl. 154—141)

Patent application No. 380,562, now Patent No. 2,459,108, relates to a process of preparing dry products soluble in cold and/or hot water from carbohydrates that will swell or dissolve in hot water which carbohydrates may be stirred with a small quantity of water to form a solution, a paste or a suspension. This process consists in submitting a mixture of the carbohydrate with an etherifying and/or an esterifying agent and contingently an alkaline substance to the cold swelling starch process. The term "cold swelling starch process" is used to indicate a treatment consisting in suddenly heating the carbohydrate mixed with a limited quantity of water for a short time at a high temperature, for gelatinizable carbohydrates preferably at a temperature above the gelatinizing point, the mass being pressed to form a thin layer which is dried at the same time or immediately thereafter. The products obtained according to the said process consist entirely or for the greater part of ethers, esters or mixed ether-esters of the carbohydrates.

It is also known to produce ethers and esters from starch or starch derivates with bi- or polyfunctional etherifying and esterifying agents. The said agents will react with two or several hydroxyl groups of the same and/or different starch molecules, whereby glucose units both of the same starch molecule and/or of different starch molecules are linked together.

The present invention is based on the observation that such ethers and/or esters of colloids containing hydroxyl groups have substantially reduced swelling properties or are even entirely or practically entirely insoluble and that this property may be utilized in a very efficient manner for the formation on carriers of layers that are highly resistant against water and insoluble therein, particularly with a view to using the said substances as finishing agents, adhesives and the like. For this purpose there are added to the colloids containing free hydroxyl groups, swollen or dissolved in water, a bi- or polyfunctional etherifying and/or esterifying agent, and contingently the proportion of alkali necessary or desirable for effecting etherification and/or esterification, and the solution of the colloid (which may contain the etherifying and/or esterifying agent in dissolved, emulsified or suspended condition) is applied to the carrier, after which it is dried preferably by a heat treatment which may be continued for some time after drying is finished.

The invention also relates to a process for preparing the dry products the solutions of which when dried in will produce the above mentioned resistant layers, which consists in mixing a colloid that will swell or dissolve in cold water and contains free hydroxyl groups, a bi- or polyfunctional etherifying and/or esterifying agent and contingently the proportion of alkali or catalyst required or desired for effecting etherification and/or esterification, in the absence of substantial amounts of water.

It has been found that in this manner films are obtained which show a far greater resistance to water than those formed by using the finishing agents and adhesives hitherto known. According to the invention it is possible, for example, to finish textile fabrics in such a way that the finish is not removed even by washing with soap at boiling temperature. This property is probably due to the fact, that the colloid with the bi- or polyfunctional etherifying or esterifying agents will produce molecules that are far larger than the original molecule of the colloid, whereby the tendency to swell in water is greatly reduced. The reduced solubility in water corresponding therewith is a drawback, if the said ethers and esters are to be employed in the manner described in patent application No. 380,562, since according to this process the ethers and esters are not formed on the carrier which has been treated with the finishing agent or adhesive, but are previously prepared. Products obtained with bi- and polyfunctional etherifying and esterifying agents and showing little tendency to swell will have the disadvantage that it is impossible to produce solutions of sufficient concentration for practical purposes. According to the invention, however, composite products are used which are soluble in water, but give solutions which when dried on carriers produce films which have practically lost their swelling power, both in cold and hot water and have become insoluble.

The invention is particularly important with regard to the bi- and polyfunctional ethers and/or esters of cold swelling starch. The term "cold swelling starch" is used for the product obtained by heating a mixture of starch or a starch derivative with a limited quantity of water for a short time at a temperature above the gelatinizing point, the mass being pressed into a thin layer and simultaneously or immediately thereafter dried. The invention may, however, also be applied to other starch derivatives and in general to other colloids containing free hydroxyl groups and able to swell or dissolve in water, such as vegetable gums, albuminous materials, cellulosic materials and the like.

The etherifying and esterifying agents used according to the invention may be both inorganic and organic. They must, however, not be too volatile, or react too quickly with water, so that they would be withdrawn prematurely from the reaction, either during the preparation of the dry products or the solutions, or during the drying or heating treatment. They must have two or more reactive functions in the molecule, e. g. reactive halogen atoms or epoxy oxygen atoms. Compounds suitable for the purpose are inter alia di- or polyhalogenated hydrocarbons, di- or polyhalogenated ethers, di- or polyhalogenated carboxylic acids or functional derivatives thereof, esters of dihydric or polyhydric alcohols with inorganic acids, acid chlorides of polybasic carboxylic or sulphonic acids and the like, e. g., dibrom-1.2 ethane, trichlor-1,2.3 propane, dibrom-1.3 propane, dichlor-2.2′ diethylether, sodium trichloracetate, sodium dichloracetate, sodium trichlor-3.3.3 lactate, sodium dibrom-2.3 butyrate, sodium dibrom-2.3 succinate, dichlor-2.2 ethanol, dichlor 2.2 ethanol, dichlor-1.3 acetone, dichlor-1.1 diethoxy-2.2 ethane, trichlor-1.1.1 methyl-2 propanol-2, trichlor-1.1.1 diethoxy-2.2 ethane, tetrachlor-1.1.3.3 acetone, dichlor-1.3 methyl-2 propanol-2, dichlor-1.3 propanol-2, dichlor-2.3 propanol-1, bis(chlormethyl) toluene, epoxy-1.2 chlor-3 propane, epoxy-1.2 chlor-3 methyl-2 propane, bis(brommethyl)-2.2 dibrom-1.3 propane, dichlor-1.3 isopropyl carbomate trichlor-2.2.2 ethanol, mannitoldichlorhydrin, erythritoldichlorhydrin, glycol-bis(chlormethylether), dichlor-1.6 bis (chlormethyl)-2.5 hexanediol-2.5, dichlor-1.3 (chlormethyl)-2 propanol-2, trichlor-1.3.4 (chlormethyl)-2 butanol-2, bis(chlormethyl)-1.4 benzene, bis(chlormethyl)-1.2 benzene, bis(brommethyl)-1.4 benzene, bis(brommethyl)-1.2 benzene, hexakis (brommethyl)-benzene, di-epoxy-1.2.3.4 butane, epithio-1.2 chlor-3 propane, bis(chlormethyl)-naphthalene, methylene, sulphate,symm. dichlor-dimethyl sulphate, succinyl dichloride, adipyl dichloride, phthalyl dichloride, naphthalene disulphochlorides and the like.

In general the ethers are to be preferred to the esters, as the former are more stable, the esters having a tendency to saponify in an alkaline solution, which is a particular drawback with regard to finishes for textile fabrics, which have to be resistant against alkaline washing.

It is also possible to use combinations of different etherifying agents, or of different esterifying agents or combinations of etherifying and esterifying agents. For such combinations it is not necessary that all of the components should be bi- or polyfunctional. The main thing is that one of the etherifying or esterifying agents is bi- or polyfunctional, while the proportion of this component relative to the monofunctional reaction agents is to be such that the final product formed by the reaction is insoluble and does not substantially swell in water.

The solutions that are to be used as finishing agents, adhesives and the like may be obtained by dissolving the colloid in water and adding the etherifying and/or esterifying agent and contingently the proportion of alkali desired for effecting the etherification or esterification. We may, however, also mix the said constituents previously in the absence of substantial quantities of water and store and sell the said dry mixtures. In most cases practically no etherification or esterification of the colloid will take place under these conditions, so that the components will be present in the mixture as such. If the mixture, however, is dissolved in water, etherification or esterification will proceed, particularly if the solution is heated on the carrier during or after drying.

In some cases, however, a conversion may already occur in the dry mixture, whereby the product will gradually become insoluble. In that case the constituent must be mixed when dissolving the product in water or only a short time before.

If the colloid to be etherified and/or esterified is cold swelling starch, the etherifying and/or esterifying agent may be added, if desired, prior to or during the cold swelling starch process so that the agent is embedded within each cold swelling starch particle. This, however, is only possible for those etherifying or esterifying agents which during the cold swelling starch process will not cause a substantial etherification or esterification and which moreover will not be decomposed when heated with water. It is possible, for instance, to add a number of etherifying agents or esterifying agents that will split off acid when reacting with the starch, prior to or during the cold swelling starch process provided the alkali necessary to produce the reaction is omitted. Nevertheless it is often advantageous in this case to add to the mixture to be converted into cold swelling starch a small proportion of alkali, e. g. 0.1% and in no case over 1% of the starch in the form of anhydrous sodium carbonate, in order to improve the swelling properties of the resulting product when being dissolved in water. The improvement thus obtained is probably due to neutralization of the acids contained in the starch.

If the mixture of cold swelling starch and etherifying and/or esterifying agent is to be used as a finishing agent, an adhesive, or the like, the said mixture is dissolved in water, and the alkali necessary for producing etherification and/or esterification, e. g. in the form of caustic soda or soda, is added.

It is, however, in this case also possible to obtain a dry product containing all constituents by adding the alkali in dry condition to the dry cold swelling starch product which has been prepared in the presence of the etherifying and/or esterifying agent.

Instead of the etherifying and/or esterifying agent the alkali can also be added before or during the cold swelling starch process and the cold swelling starch obtained in this way can be mixed in dry condition with the etherifying and/or esterifying agent, or the agent can be added when preparing the solution to be applied on the carrier.

According to another embodiment of the invention two dry cold swelling starch preparations are prepared which when dissolved in water in a predetermined ratio will produce together a solution of the desired composition and which may be placed on the market as such. Of the said cold swelling starch preparations one is obtained by mixing cold swelling starch with alkali, e. g. soda, in the absence of substantial quantities of water or by adding alkali before or during the manufacturing process of the cold swelling starch, while the other is obtained by mixing cold swelling starch with the etherifying and/or esterifying agent, or by the addition of the etherifying and/or esterifying agent before or during the cold swelling starch process. If desired the said two dry cold swelling starch preparations may be mixed and stored in mixed condition, with the exception, however, of the above mentioned case in which the reaction will already set in in dry condition. In that case it will be necessary either to add the two cold swelling starches separately to the water or to mix them only a short time before dissolving the same.

In order to bring about complete etherification and/or esterification after the solution has been applied to the carrier, it is desirable to use a heat treatment. This may be done by heating after drying or by drying at elevated temperature and if necessary by additionally heating for some time after drying.

The drying or heating temperature depends on the reagent and the colloid used. The time of heating depends on the same factors and the temperature and varies from a few minutes to half an hour or more.

For obtaining washproof finishes on textile fabrics e. g. excellent results are already obtained in many cases if the fabric after having been impregnated is subjected to one of usual drying processes, e. g. on heated drums or plates. The process according to the invention is therefore particularly suitable for finishing purposes and for glueing at elevated temperatures, e. g. when producing corrugated pasteboard and it is less suitable for adhesives used at ordinary temperatures.

The invention will be illustrated by the following examples:

Example 1

1 kilogram of cold swelling starch produced by the usual process is dissolved in 10 liters of water. 400 grams of caustic soda of 36° Bé. and a solution of 186 grams of sodium trichloracetate in 250 cm.$^3$ of water are added while stirring. A cotton fabric is impregnated with the starch paste and pressed. The fabric is subsequently dried for 15–60 minutes at a temperature of at least 90° C., whereby a finish is obtained that is far more resistant against washing than an ordinary starch finish.

Example 2

72 gr. of dichlor-2,2 diethylether were emulsified in a solution of 250 g. of casein in one liter of 1 N caustic soda. Two wooden boards are glued with this emulsion by heating the boards for 8 minutes at 95° C. under a pressure of 3 kg/sq. cm. The same experiment was made with an alkaline casein solution to which no dichlordiethylether had been added.

The glued boards of the two experiments were heated in water of 90° C. and it was found that the boards of the first experiment were far more proof against water than the boards of the second experiment.

Example 3

525 g. of bis(chlormethyl)-1.4 benzene, 2 kgs. of potato cold swelling starch and 480 g. of anhydrous soda are intimately mixed. This product mixed with 10–20 parts of cold water may be made into a paste which may be used as a wash proof finish for textile fabrics.

Example 4

2 kgs. of potato starch are intimately mixed with 450 g. of bis(chlormethyl) naphthalene and the mixture is suspended in 6 liters of water of approximately 40° C. containing 10 g. of anhydrous sodium carbonate. The suspension is heated while stirring until a paste is produced and dried by the process usual for cold swelling starch. The product can be dissolved in 10 parts of cold water to a paste which, mixed with 400 c. cm. of a caustic soda solution of 36° Bé. to each kilogram of the dry product may be used as a wash proof finish for textile fabrics.

Example 5

2 kgs. of potato starch are suspended in 2.5 liters of water in which 372 grams of sodium trichloracetate have been dissolved. This suspension is converted into cold swelling starch in the usual manner. 100 g. of this product are mixed with 8 grams of anhydrous sodium carbonate and the mixture is dissolved in one liter of cold water. If 14 c. cm. of a caustic soda solution of 36° Bé. are added to this solution, it may be used for imparting a wash proof finish to textile fabrics.

In many cases smaller proportions of the bi- or poly-functional reagent than described in the above examples will suffice. Depending on the compounds used excellent results may often be obtained with proportions of less than 1 mol per kg. of the cold swelling starch.

Example 6

80 parts by weight of erythritoldichlorohydrine and 3 parts by weight of anhydrous soda are dissolved in 2000 parts by weight of water. 2000 parts of tapioca starch are suspended in this solution and the suspension is converted into cold swelling starch after well known methods.

The process according to the invention may be used i. e. for applying wash proof finishes to fabrics made of cotton, linen, wool, artificial silk and cellulose staple fibres and mixtures of the same or with other fabrics. The products according to the invention may also be used as binding agents for pigments, whereby it is possible to combine the dyeing and finishing treatments, in order to obtain wash-proof and light-proof colours when using coloured pigments. Glossy artificial silk may be given a wash proof dull lustre, and wash proof dull effects may be obtained by printing the finishing agents according to the invention with pigments. It is possible to avoid the peeling off of the so-called loaded finishes and to obtain wash proof finishes, dependent on the proportion of the loading agent.

The invention may also serve for the sizing of the backs of plush fabrics and carpets (velvet and similar fabrics), in order to obtain wash proof sizings in which the pile is anchored. It may also be used for improving the resistance of fabrics made of cellulose staple fibre (particularly in a wet condition) to abrasion or wear, a general improvement of the quality being obtained in this case.

The products according to the invention may also be used as adhesives, e. g. for glueing wood or veneer, for sizing paper and as adhesives or binding agents for all kinds of granular, fibrous and pulverulent materials.

We claim:

1. A process of producing a film insoluble in water and organic solvents on the surface of a material, comprising applying to said surface a solution of a polysaccharide containing at least one free hydroxyl group and capable of being dissolved in water to a colloidal solution, to which solution have been added an agent of the group consisting of etherifying agents containing at least two reactive halogen atoms, etherifying agents containing at least two reactive epoxy groups, etherifying agents containing at least one reactive halogen atom and one reactive epoxy group, esterifying agents containing at least two reactive acid groups, the anhydrides derived therefrom and the acid halides derived therefrom, and the proportion of alkaline substance necessary for effecting the reaction of said agent with said polysaccharide and drying the material together with the solution.

2. A process of sizing fibrous materials, comprising applying to said material a solution of a polysaccharide containing at least one free hydroxyl group and capable of being dissolved in water to a colloidal solution, to which solution have been added an agent of the group consisting of etherifying agents containing at least two reactive halogen atoms, etherifying agents containing at least two reactive epoxy groups, etherifying agents containing at least one reactive halogen atom and one reactive epoxy group, esterifying agents containing at least two reactive acid groups, the anhydrides derived therefrom and the acid halides derived therefrom, and the proportion of alkaline substance necessary for effecting the reaction of said agent with said polysaccharide and drying the fibrous material together with the solution.

3. A process of glueing together surfaces, comprising applying to said surfaces a solution of a polysaccharide containing at least one free hydroxyl group and capable of being dissolved in water to a colloidal solution, to which solution have been added an agent of the group consisting of etherifying agents containing at least two reactive halogen atoms, etherifying agents containing at least two reactive epoxy groups, etherifying agents containing at least one reactive halogen atom and one reactive epoxy group, esterifying agents containing at least two reactive acid groups, the anhydrides derived therefrom and the acid halides derived therefrom, and the proportion of alkaline substance necessary for effecting the reaction of said agent with said polysaccharide, contacting said surfaces and drying the unit thus obtained.

4. A process of binding discrete particles, comprising applying to the surfaces of said discrete particles a solution of a polysaccharide containing at least one free hydroxyl group and capable of being dissolved in water to a colloidal solution, to which solution have been added an agent of the group consisting of etherifying agents containing at least two reactive halogen atoms, etherifying agents containing at least two reactive epoxy groups, etherifying agents containing at least one reactive halogen atom and one reactive epoxy group, esterifying agents containing at least two reactive acid groups, the anhydrides derived therefrom and the acid halides derived therefrom, and the proportion of alkaline substance necessary for effecting the reaction of said agent with said polysaccharide, and drying the material together with the solution.

5. A process of producing a film insoluble in water and organic solvents on the surface of a material, comprising applying to said surface a solution of a polysaccharide containing at least one free hydroxyl group and capable of being dissolved in water to a colloidal solution, to which solution have been added an agent of the group consisting of etherifying agents containing at least two reactive halogen atoms, etherifying agents containing at least two reactive epoxy groups, etherifying agents containing at least one reactive halogen atom and one reactive epoxy group, esterifying agents containing at least two reactive acid groups, the anhydrides derived therefrom and the acid halides derived therefrom, and the proportion of alkaline substance necessary for effecting the reaction of said agent with said polysaccharide and drying the material together with the solution and heating the same.

6. A process according to claim 1 in which the polysaccharide is a starch material.

7. A process according to claim 1 in which the polysaccharide is ordinary starch.

8. A process according to claim 1 in which the polysaccharide is cold swelling starch.

9. A process according to claim 1 in which the polysaccharide is a water soluble cellulosic material.

10. A dry product consisting of a mixture of a polysaccharide containing at least one free hydroxyl group and capable of being dissolved in water to a colloidal solution and an agent of the group consisting of etherifying agents containing at least two reactive halogen atoms, etherifying agents containing at least two reactive epoxy groups, etherifying agents containing at least one reactive halogen atom and one reactive epoxy group, esterifying agents containing at least two reactive acid groups, the anhydrides derived therefrom and the acid halides derived therefrom, the proportion of said agent being such, that a solution of said dry product when admixed with an alkaline substance will produce a film insoluble in water and organic solvents when dried on said material.

11. A dry product according to claim 10 in which the polysaccharide is a starch material.

12. A dry product according to claim 10 in which the polysaccharide is cold swelling starch.

13. A dry product according to claim 10 in which the polysaccharide is cold swelling starch, the agent being embedded within the cold swelling starch particles.

14. A dry product consisting of a mixture of a polysaccharide containing at least one free hydroxyl group and capable of being dissolved in water to a colloidal solution and an agent of the group consisting of etherifying agents containing at least two reactive halogen atoms, etherifying agents containing at least two reactive epoxy groups, etherifying agents containing at least one reactive halogen atom and one reactive epoxy group, esterifying agents containing at least two reactive acid groups, the anhydrides derived therefrom and the acid halides derived therefrom, and the proportion of alkaline substance necessary for effecting the reaction of said agent with said polysaccharide, the proportion of said agent being such that a solution of said dry product when dried on the surface of a material will produce a film insoluble in water and organic solvents on said surface.

15. A dry product according to claim 14 in which the polysaccharide is a starch material.

16. A dry product according to claim 14 in which the polysaccharide is cold swelling starch.

17. A dry product according to claim 14 in which the polysaccharide is cold swelling starch, the cold swelling starch and the agent being present in the form of a uniform mixture, in which the agent is embedded within the cold swelling starch particles 18. A dry product according to claim 14 in which the polysaccharide is cold swelling starch, the cold swelling starch and the alkaline substance being present in the form of a uniform mixture, in which the alkaline substance is embedded within the cold swelling starch particles.

19. A dry product according to claim 14 in which the polysaccharide is cold swelling starch, the cold swelling starch, the agent and the alkaline substance being present in the form of a mixture of cold swelling starch particles having said agent embedded therein and cold swelling starch particles having said alkaline substance embedded therein.

JAN LOLKEMA.
CORNELIS M. H. KOOL.

REFERENCES CITED

The following references are of record in the file of this patent:

UNITED STATES PATENTS

| Number | Name | Date |
|---|---|---|
| 1,020,655 | Perkins | Mar. 19, 1912 |
| 1,105,739 | Wünsche | Aug. 4, 1914 |
| 1,578,960 | Davis | Mar. 30, 1926 |
| 1,989,150 | Pierson | Jan. 29, 1935 |
| 2,037,740 | Salzberg | Apr. 21, 1936 |
| 2,220,508 | Bock et al. | Nov. 5, 1940 |
| 2,451,686 | Moller | Oct. 19, 1948 |

OTHER REFERENCES

Kerr, Chemistry and Industry of Starch, Academic Press, Inc., N. Y. C., N. Y. (1944), pages 213 and 214.